(12) United States Patent
Yun et al.

(10) Patent No.: US 12,554,360 B2
(45) Date of Patent: Feb. 17, 2026

(54) TOUCH DETECTION DEVICE CAPABLE OF SUPPRESSING EMI EFFECT

(71) Applicant: G2touch Co., Ltd., Seongnam-si (KR)

(72) Inventors: Dong-Won Yun, Seongnam-si (KR); Sung-Won Cho, Seongnam-si (KR)

(73) Assignee: G2touch Co., Ltd., Seongnam-si (KR)

( * ) Notice: Subject to any disclaimer, the term of this patent is extended or adjusted under 35 U.S.C. 154(b) by 0 days.

(21) Appl. No.: 19/017,797

(22) Filed: Jan. 13, 2025

(65) Prior Publication Data
US 2025/0335054 A1     Oct. 30, 2025

(30) Foreign Application Priority Data

Apr. 30, 2024   (KR) .......................... 10-2024-0057891

(51) Int. Cl.
G06F 3/041     (2006.01)
G06F 3/044     (2006.01)

(52) U.S. Cl.
CPC ........ G06F 3/04166 (2019.05); G06F 3/0446 (2019.05); *G06F 2203/04107* (2013.01)

(58) Field of Classification Search
CPC ............... G06F 3/04166; G06F 3/0446; G06F 2203/04107
See application file for complete search history.

(56) References Cited

U.S. PATENT DOCUMENTS

2024/0281090 A1*   8/2024   Ku ..................... G06F 3/0412

FOREIGN PATENT DOCUMENTS

| KR | 20190048189 A | 5/2019 |
| KR | 20210050285 A | 5/2021 |
| KR | 20210086332 A | 7/2021 |
| KR | 20220064240 A | 5/2022 |
| KR | 20230088324 A | 6/2023 |

* cited by examiner

*Primary Examiner* — Deeprose Subedi
(74) *Attorney, Agent, or Firm* — NKL Law; Jae Youn Kim

(57) ABSTRACT

A touch detection device includes a panel including a plurality of electrodes regularly arranged in rows and columns, a multiplexer connected to electrodes arranged in a specific column through connection lines and configured to form a sensing channel by connecting the plurality of electrodes in a row or a column, and a sensor driving unit operably coupled to the multiplexer and configured to perform a control operation so that a driving signal of a voltage waveform of a specific cycle is applied to the electrodes. The sensor driving unit applies pulse-shaped driving signals having different driving frequencies to each specific row.

8 Claims, 10 Drawing Sheets

TOUCH DETECTION DEVICE CAPABLE OF SUPPRESSING EMI EFFECT

BACKGROUND OF THE INVENTION

Field of the Invention

The present invention relates to a method of driving a touch panel, and more particularly to frequency hopping of a touch panel detection device capable of suppressing an EMI effect.

Description of the Related Art

Electromagnetic interference (EMI) is undesired noise or interference in an electrical path or circuit caused by a source, and is also referred to as radio frequency interference. EMI may cause electronic devices to improperly work, malfunction, or stop working completely. EMI may occur due to a natural or man-made source, and an EMI effect may be reduced using a high-quality electronic device, electrical shielding, and modern error correction. General examples of EMI include electrical noise that is heard when a mobile phone is placed near powered audio equipment or speakers.

Electric current, which is movement of an electric charge, creates a magnetic field, and a moving magnetic field creates an electric current. An electrical conductor may act as an antenna for radio waves. High-power electrical and radio sources may have undesired effects on devices located far away. As electronic devices become smaller, faster, more compact, and more sensitive, the electronic devices become more susceptible to effects of radio waves, which generates EMI.

This EMI may result from several sources. For example, high-power radio and electrical sources may cause undesired EMI. Improperly designed consumer electronic devices may cause EMI in other devices.

Meanwhile, a touch panel includes a plurality of electrodes. An object such as a finger or a stylus provides input by changing capacitance between electrodes included in the touch panel. In order for the touch panel to detect the input provided by the object, a driving circuit needs to apply a driving signal. However, there is a problem in that EMI formed by the driving signal affects the plurality of electrodes and/or a plurality of driving circuits in the panel, so that detection performance deteriorates.

SUMMARY OF THE INVENTION

A task to be solved by the present invention is to solve such difficulties. A task to be solved by the present invention is to provide a method of driving a touch panel capable of reducing an EMI effect in the touch panel.

A task to be solved by the present invention is to alleviate interference with adjacent electronic devices due to occurrence of an EMI peak in a specific row of a touch panel.

A task to be solved by the present invention is to provide a method of driving a touch panel capable of reducing occurrence of an EMI peak in an electronic device including the touch panel.

However, the tasks to be solved by the present invention are not limited to the technical tasks mentioned above, and other technical tasks not mentioned herein may be clearly understood by a person having ordinary knowledge in the field from the description of the present invention.

In accordance with the present invention, the above and other objects can be accomplished by the provision of a touch detection device includes a panel including a plurality of electrodes regularly arranged in rows and columns, a multiplexer connected to electrodes arranged in a specific column through connection lines and configured to form a sensing channel by connecting the plurality of electrodes in a row or a column, and a sensor driving unit operably coupled to the multiplexer and configured to perform a control operation so that a driving signal of a voltage waveform of a specific cycle is applied to the electrodes. The sensor driving unit applies pulse-shaped driving signals having different driving frequencies to each specific row. When an amount of EMI radiation of a specific connection line to which the driving signal is applied is greater than or equal to a threshold, the sensor driving unit applies a signal of a reverse voltage waveform to an electrode of one of rows adjacent to the specific row. Lengths of the connection lines are differently set according to positions of electrodes arranged in the specific row.

According to an embodiment, the sensor driving unit may apply a first driving signal of a first driving frequency to a first row, apply a second driving signal of a second driving frequency to a second row adjacent to the first row, apply an (N−1)th driving signal of an (N−1) th driving frequency to an (N−1)th row, and apply an Nth driving signal of an Nth driving frequency to an Nth row adjacent to the (N−1)th row.

According to an embodiment, the sensor driving unit may apply pulse-shaped driving signals having different driving frequencies to each specific row in a first frame including a plurality of pulses, determine a start point of a second frame adjacent to the first frame based on timing at which falling edges of the driving signals of the first frame coincide with each other, apply pulse-shaped driving signals having different driving frequencies to each specific row in the second frame, determine a start point of a third frame adjacent to the second frame based on timing at which falling edges of the driving signals of the second frame coincide with each other, apply pulse-shaped driving signals having different frequencies to each specific row in the third frame, and set the driving frequencies applied to the specific row are set to different driving frequencies in the first frame, the second frame, and the third frame.

According to an embodiment, the sensor driving unit may apply the first driving signal of the first driving frequency to the first row in a first frame including a plurality of pulses, apply a driving signal of one of the second to Nth driving frequencies other than the first driving frequency in a second frame adjacent to the first frame, and apply a driving signal of a driving frequency other than the driving frequencies in the first and second frames in a third frame adjacent to the second frame.

According to an embodiment, the sensor driving unit may apply the driving signals of the first to Nth driving frequencies to the first to Nth rows when an amount of EMI radiation of a specific connection line to which the driving signal is applied is less than or equal to a threshold, and change all the driving frequencies of the driving signals applied to the first to Nth rows to different driving frequencies when the amount of EMI radiation of the specific connection line exceeds the threshold.

According to an embodiment, when the amount of EMI radiation of the specific connection line exceeds the threshold, the sensor driving unit may determine a specific driving frequency of a specific row corresponding to the specific connection line and frequency offsets of the specific driving frequency and adjacent driving frequencies of adjacent rows adjacent to the specific row so that the frequency offsets are greater than or equal to a threshold.

According to an embodiment, the sensor driving unit may change all the driving frequencies of the driving signals applied to the first to Nth rows in the second frame to different driving frequencies and set a second frame period of the second frame to be shorter than a first frame period of the first frame when the amount of EMI radiation of the specific connection line exceeds the threshold in the first frame, and change all the driving frequencies of the driving signals applied to the first to Nth rows in the third frame to different driving frequencies and set a third frame period of the third frame to be shorter than the second frame period of the second frame when the amount of EMI radiation of the specific connection line exceeds the threshold in the second frame.

According to an embodiment, the sensor driving unit may change all the driving frequencies of the driving signals applied to the first to Nth rows in the third frame to different driving frequencies and set the third frame period of the third frame to be longer than the second frame period of the second frame when the amount of EMI radiation of the specific connection line is less than or equal to the threshold in the second frame, and maintain the driving frequencies of the driving signals applied to the first to Nth rows when the amount of EMI radiation of the specific connection line is less than or equal to a second threshold lower than the threshold in the third frame.

According to an embodiment, when the amount of EMI radiation exceeds the second threshold and is less than or equal to the threshold, the sensor driving unit may change all the driving frequencies of the driving signals applied to the first to Nth rows in a fourth frame adjacent to the third frame to different driving frequencies and set a fourth frame period of the fourth frame to be shorter than the third frame period of the third frame.

According to an embodiment, the sensor driving unit may determine whether an EMI peak value at a specific frequency is less than or equal to a magnitude of a threshold or has decreased by a predetermined value or more based on a maximum value in conjunction with an EMI detection unit, set the driving frequencies to repeat a frequency hopping result in which the driving frequencies in the first frame, the second frame, and the third frame are changed when the EMI peak value has decreased as a result of determination, and repeat sequences of the driving frequencies so that an order of the first frame, the second frame, and the third frame is repeated.

According to an embodiment, the sensor driving unit may determine whether an EMI peak value at a specific frequency is less than or equal to a magnitude of a threshold or has decreased by a predetermined value or more based on a maximum value in conjunction with an EMI detection unit, detect a rising edge and a falling edge of the driving signal of the voltage waveform for each specific column or each specific row upon determining that the EMI peak value has not decreased as a result of determination, detect a first area between the rising edge and the falling edge, and cancel out an EMI component of the voltage waveform by changing a second area of a second driving signal of a reverse voltage waveform to correspond to the first area.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
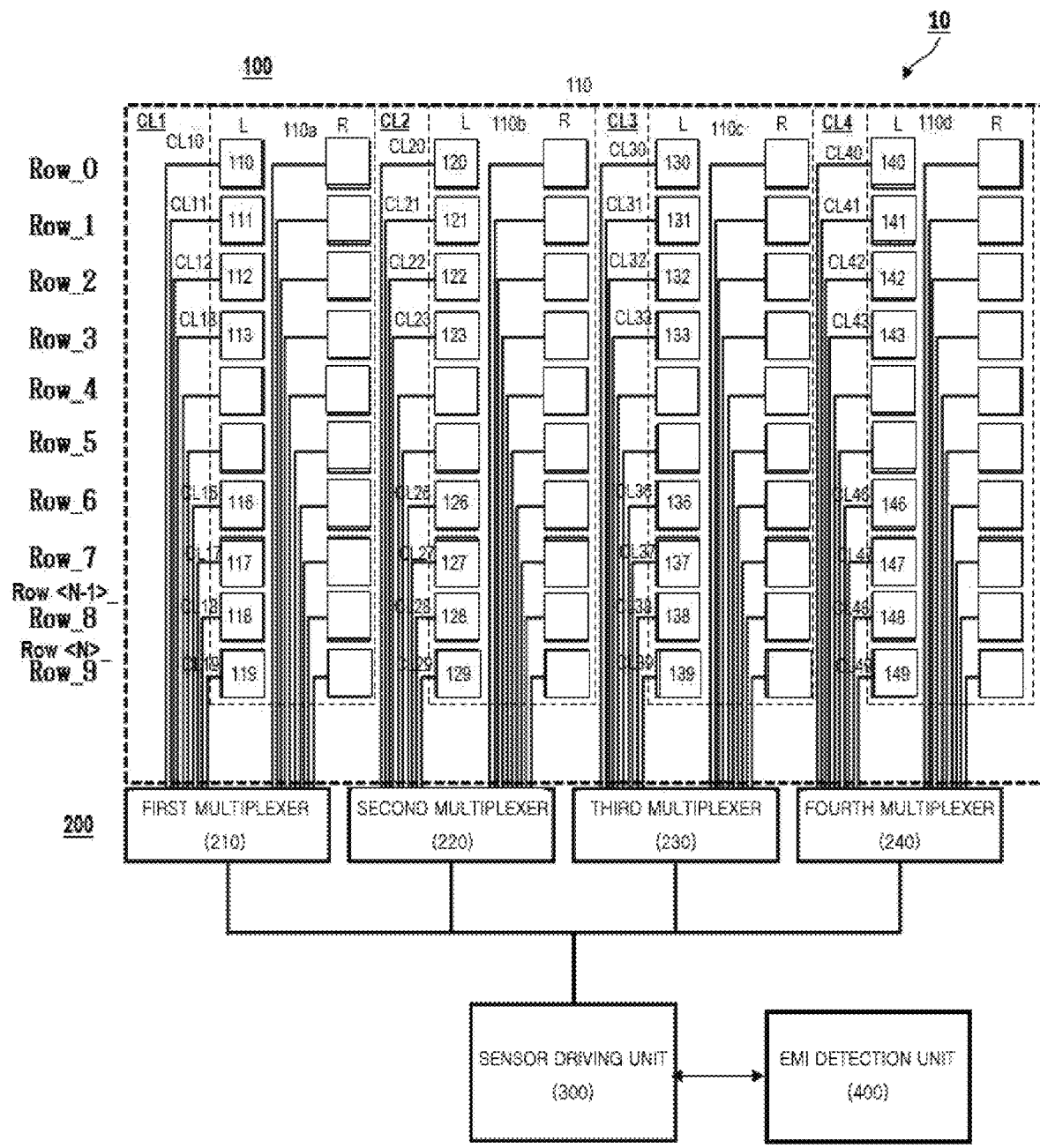
FIG. 1 is a block diagram illustrating a detailed configuration of a touch detection device according to the present invention.

Hereinafter, preferred embodiments of the present invention will be described in detail with reference to the attached drawings. Prior thereto, terms or words used in this specification and claims should not be construed as limited to usual or dictionary meanings, and should be interpreted as having meanings and concepts consistent with the technical idea of the present invention based on the principle that an inventor may appropriately define a concept of a term to describe the invention of the inventor in the best way possible. Therefore, the embodiments described in this specification and the configurations shown in the drawings are only one of the most preferred embodiments of the present invention and do not represent the entire technical idea of the present invention. Thus, it should be understood that, at the time of filing this application, there may be various equivalents and modifications that can replace the embodiments and configurations.

FIG. 1 is a block diagram illustrating a detailed configuration of a touch detection device according to the present invention. Referring to FIG. 1, the touch detection device 10 may include a panel 100, a multiplexer 200, and a sensor driving unit 300.

The touch detection device 10 may include the panel 100 including a plurality of electrodes regularly arranged in rows and columns, the multiplexer 200 for electrically connecting some of the electrodes to form a plurality of sensing channels 110a to 110d, and the sensor driving unit 300 for providing driving signals to the sensing channels 110a to 110d. The sensor driving unit 300 may perform a control operation so that the same or different driving signals are output to different sensing channels. The sensor driving unit 300 may perform a control operation so that the timing of rising/falling edges are different between adjacent rows, or may perform a control operation so that signals of voltage waveforms in opposite directions are applied as described below.

As illustrated in FIG. 1, the panel 100 according to the present invention may be a self-dot type panel. In the self-dot type panel 100, a plurality of electrodes is regularly arranged in rows and columns. As illustrated in FIG. 1, the electrodes may be rectangles. According to an embodiment not illustrated, the electrodes may each have a shape such as a rhombus or a triangle, and may be complementarily arranged with electrodes in adjacent rows or columns.

The plurality of electrodes may function as a single electrode forming a capacitor with an object such as a finger or a stylus providing touch input. As the object approaches the panel 100 having the plurality of electrodes, the capacitance of the capacitor formed with the electrodes increases. On the other hand, as the object moves away from the panel 100 having the plurality of electrodes, the capacitance of the capacitor formed with the electrodes decreases.

The multiplexer 200 may include a plurality of switches 210 to 240. The plurality of switches 210 to 240 may be implemented as multiplexers or may be implemented so that only electrodes of some channels are connected.

A plurality of electrodes is connected to the multiplexer 200 via conductive wires. The multiplexer 200 connects the plurality of electrodes in rows or columns to form the sensing channels 110a to 110d. In the embodiment illustrated in FIG. 1, the plurality of electrodes is connected in a column direction to form the sensing channels 110a to 110d. In an embodiment not illustrated, the plurality of electrodes may be connected in rows to form sensing channels.

The sensor driving unit 300 provides a driving signal to the sensing channels 110a to 110d to detect touch input by the object. The embodiment illustrated in FIG. 1 illustrates an example in which a single driving unit detects touch input on one panel 100. However, the present invention is not limited thereto, and a separate main control unit (not shown) may control a plurality of sensor driving units, and each sensor driving unit may drive the sensing channels 110a to 110d.

The sensor driving unit 300 may provide the same driving signal to a left column (L) and a right column (R) included in the sensing channels 110a to 110d. For example, the sensor driving unit 300 may synchronize a rising edge of a driving signal provided to the left column (L) with a rising edge of a driving signal provided to the right column (R). A falling edge of the driving signal provided to the left column (L) and a falling edge of the driving signal provided to the right column (R) may be synchronized with each other. However, the present invention is not limited thereto. For example, the sensor driving unit 300 may provide a phase difference between driving signals provided to one sensing channel 110 and another adjacent sensing channel so that the same edges do not overlap each other.

The sensor driving unit 300 may provide driving signals having a reversed relationship to the left column (L) and the right column (R) included in the sensing channels 110a to 110d. As in the illustrated example, the sensor driving unit 300 may synchronize the rising edge of the driving signal provided to the left column (L) with the falling edge of the driving signal provided to the right column (R). The falling edge of the driving signal provided to the left column (L) and the rising edge of the driving signal provided to the right column (R) may be provided to be synchronized with each other. However, the present invention is not limited thereto. For example, in addition, the sensor driving unit 300 may provide a phase difference between driving signals provided to one sensing channel 110 and another adjacent sensing channel.

Meanwhile, the panel 100 may include a plurality of electrodes regularly arranged in rows and columns. The electrodes may be arranged in a first row, a second row, . . . , an eighth row, and a ninth row, respectively. In this regard, the number of the plurality of rows of the electrodes is not limited to nine and may be changed depending on the application. The plurality of rows of the electrodes may be arranged in the second row, . . . , an (N−1)th row, and an Nth row. The electrodes may be arranged in a first column, a second column, a third column, and a fourth column, respectively. In this regard, the number of the plurality of columns of the electrodes is not limited to four and may be changed depending on the application.

The electrodes arranged in the first column may form the first sensing channel 110a. The first sensing channel 110a may include a plurality of electrodes 110 to 119 arranged in a plurality of rows. The electrodes arranged in the second column may form the second sensing channel 110b. The second sensing channel 110b may include a plurality of electrodes 120 to 129 arranged in a plurality of rows. The electrodes arranged in the third column may form the third sensing channel 110c. The third sensing channel 110c may include a plurality of electrodes 130 to 139 arranged in a plurality of rows. The electrodes arranged in the fourth column may form the fourth sensing channel 110d. The fourth sensing channel 110d may include a plurality of electrodes 140 to 149 arranged in a plurality of rows. In this regard, the number of a plurality of rows of electrodes is not limited to nine and may be changed depending on the application.

The multiplexer 200 may be connected to the electrodes arranged in specific columns and specific rows through connection lines CL1, CL2, CL3, and CL4. The sensor driving unit 300 may be operably coupled to the multiplexer 200. The sensor driving unit 300 may perform a control operation so that a driving signal of a voltage waveform of a specific cycle may be applied to the electrodes 110, 120, 130, and 140.

The connection lines CL1 of the first column may include first to tenth connection lines CL10 to CL19. The connection lines CL2 of the second column may include first to tenth connection lines CL20 to CL29. The connection lines CL3 of the third column may include first to tenth connection lines CL30 to CL39. The connection lines CL3 of the third column may include first to tenth connection lines CL30 to CL39. Lengths of the connection lines CL1, CL2, CL3, and CL4 may be differently set depending on the positions of the electrodes arranged in specific rows.

The present invention is a method of reducing EMI of a touchscreen, which is effective in reducing EMI by variably applying a touch sensing frequency per row or per touch frame, and is particularly effective in reducing AVERAGE and QUASI-PEAK.

Figure 2:
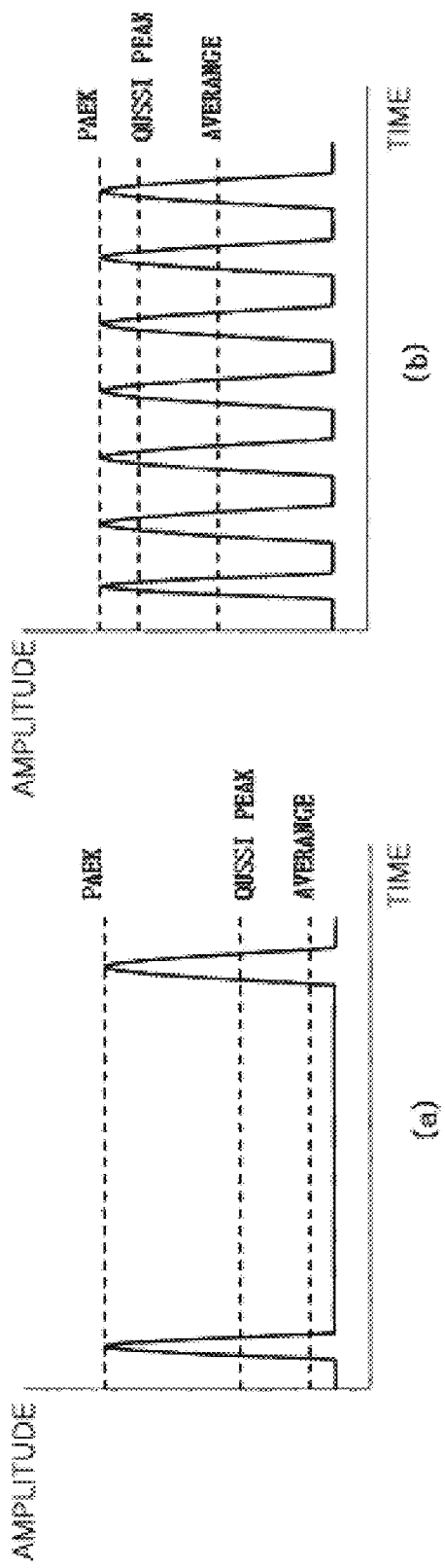
FIG. 2 is a diagram illustrating a relationship between signal repeatability and EMI PEAK/AVERAGE/QUASI-PEAK.

EMI AVERAGE and QUASI-PEAK are EMI result items closely related to signal repeatability. AVERAGE represents an average value of a specific frequency signal during a scan time, and QUASI-PEAK represents repeatability of a specific frequency and magnitude of a signal during the scan time. In this regard, FIG. 2 is a diagram illustrating a relationship between signal repeatability and EMI PEAK/AVERAGE/QUASI-PEAK. Referring to FIG. 2, as the same frequency signal of EMI is repeated, an increase in AVERAGE and QUASI-PEAK is greatly affected. In these frequency repeatability-based EMI items, EMI avoidance may be difficult in a typical touch driving method.

Figure 3:
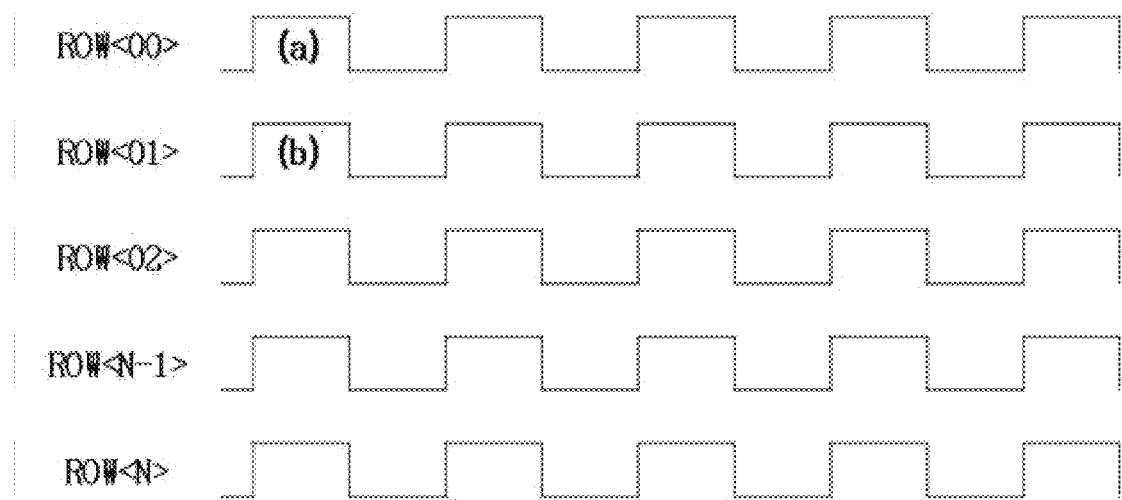
FIG. 3 is a diagram illustrating sensing at the same frequency for each row.
Figure 4:
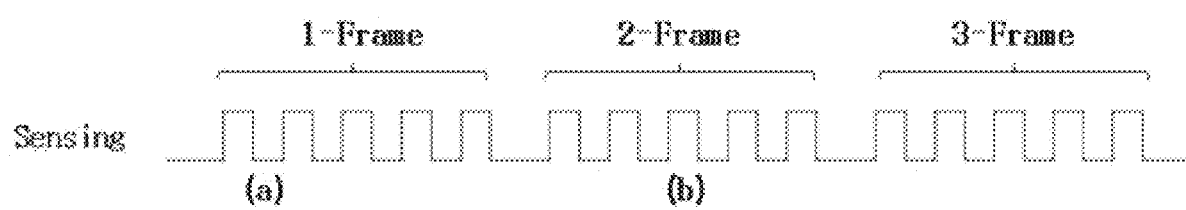
FIG. 4 is a diagram illustrating sensing at the same frequency for each frame.

FIG. 3 is a diagram illustrating sensing at the same frequency for each row. FIG. 4 is a diagram illustrating sensing at the same frequency for each frame.

Touch sensing may be performed at the same sensing frequency from the first ROW to the last ROW as illustrated in FIG. 2. Sensing from the first ROW to the last ROW is performed in a group referred to as 1-Frame, and receives input of a plurality of frames to calculate touch input. In terms of EMI, this type of sensing is a main factor in that sensing is repeated countless times at the same frequency, which increases the AVERAGE value and QUASI-PEAK of EMI, and as the number of repetitions increases, the AVERAGE or QUASI-PEAK better approximates the PEAK.

Figure 5:
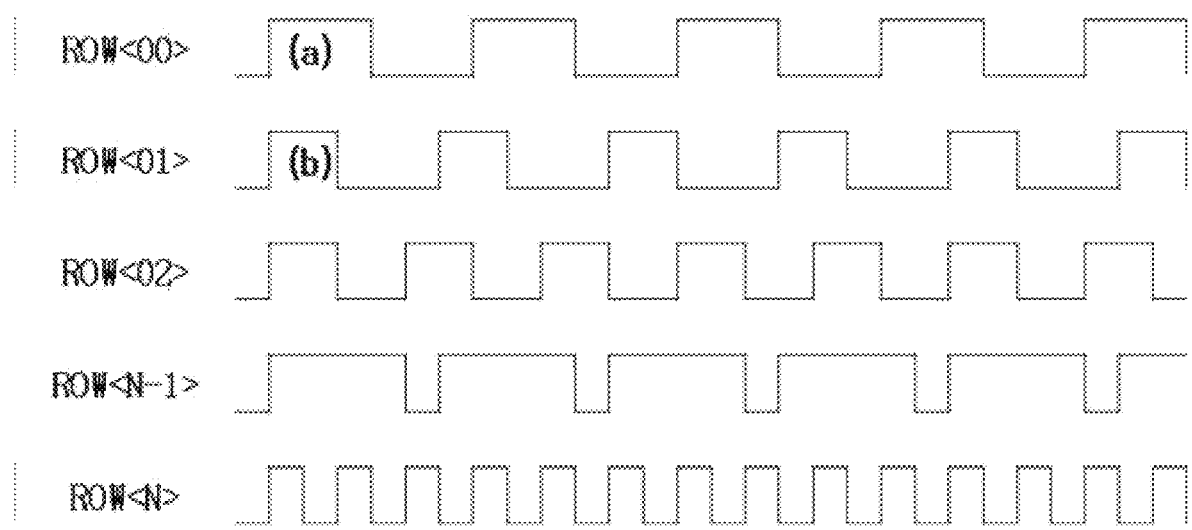
FIG. 5 is a diagram illustrating sensing at a different frequency for each row.
Figure 6:
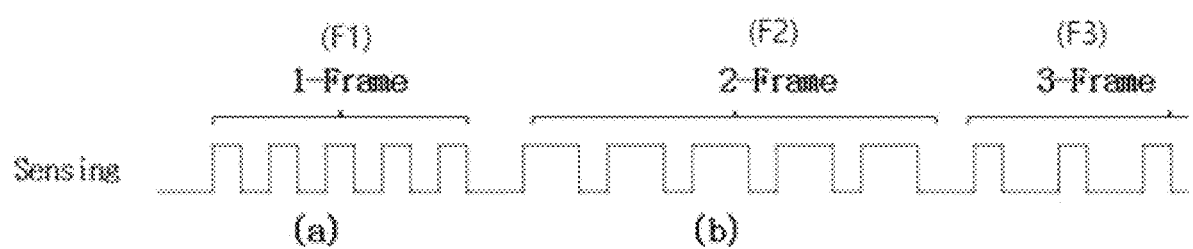
FIG. 6 is a diagram illustrating sensing at a different frequency for each frame.

A task to be solved by the present invention is to solve this problem. In this regard, FIG. 5 is a diagram illustrating sensing at a different frequency for each row. FIG. 6 is a diagram illustrating sensing at a different frequency for each frame.

Instead of using the same sensing frequency for all rows and frames, a sensing frequency may be differently applied for each row as illustrated in FIG. 4 or for each frame as illustrated in FIG. 5. This is significantly effective in reducing EMI AVERAGE and QUASI-PEAK, and since a similar spread spectrum effect that disperses the frequency may be obtained, it is possible to reduce EMI PEAK.

A technical name of FIG. 5 is "row frequency hopping", which adjusts a sensing frequency by varying a charging time or a discharging time of a sensor for each row. In this method, the charging time is adjusted and the frequency is varied as in (a) and (b) in FIG. 5 unlike (a) and (b) in FIG. 2 which have the same frequency. Varying is differently applied for each row to avoid repetition of the same frequency, and thus is effective in reducing EMI AVERAGE and QUASI-PEAK at which repeatability of a specific frequency is important. In addition, there is a characteristic in that touch performance does not deteriorate.

Figure 7:
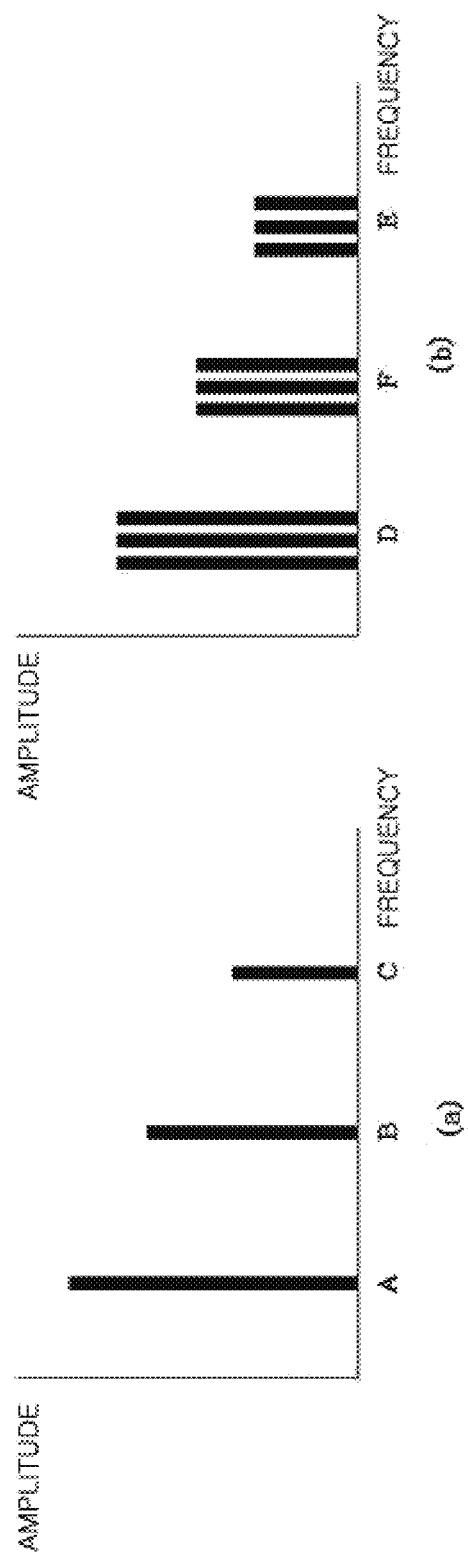
FIG. 7 is a diagram illustrating an expected EMI result for each frequency according to the present invention.
Figure 8:
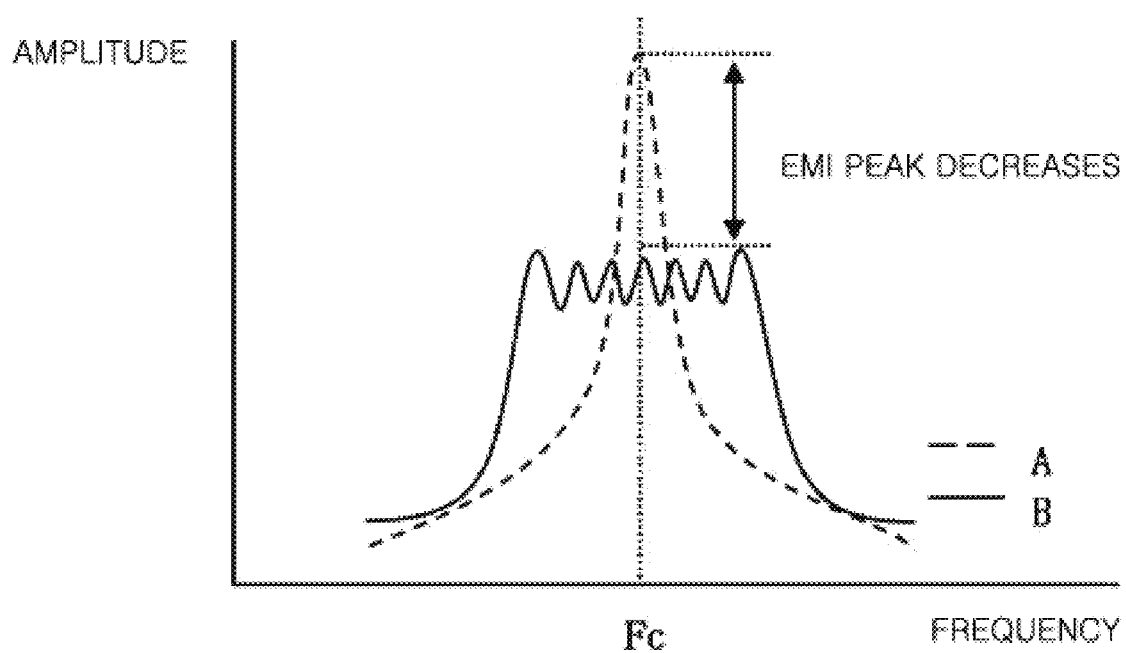
FIG. 8 is a diagram illustrating a result showing a reduction in an EMI peak according to the present invention.

FIG. 7 is a diagram illustrating an expected EMI result according to the present invention. FIG. 8 illustrates expected EMI AVERAGE and QUASI-PEAK result values when row frequency hopping is applied. (a) in FIG. 7 is general sensing, and (b) in FIG. 7 is row frequency hopping. As a frequency increases, a signal increases, but magnitude of an EMI signal significantly decreases.

FIG. 8 is a diagram illustrating a result showing a reduction in an EMI peak according to the present invention. There is a similar effect to that of a spread spectrum, which is a method of transmitting data by additionally using various frequencies to widely disperse frequencies. As in FIG. 8, signals emitted at a specific frequency are dispersed to several frequencies to reduce an influence of a specific frequency, thereby obtaining an EMI PEAK reduction effect.

"Row frequency hopping" may differently apply a sensing frequency for each row. A name of a method of applying a sensing frequency for each frame may be "frame frequency hopping". When second frame (F2) sensing of (b) in FIG. 5 starts after completion of first frame (F1) sensing of (a) in FIG. 6, an EMI PEAK/AVERAGE/QUASI-PEAK reduction effect such as "row frequency hopping" may be obtained by operation at a sensing frequency different from that applied in a first frame (F1). Since these two EMI reduction methods may be used in a plurality of applications rather than a single application, specific frequencies unfavorable to EMI may be effectively dispersed, and thus EMI of a touch component may be effectively reduced.

Hereinafter, a description will be given of the touch detection device 10 according to the present invention with reference to FIG. 1 and FIGS. 4 to 8. The touch detection device 10 may include the panel 100, the multiplexer 200, and the sensor driving unit 300.

The touch detection device 10 may include the panel 100 including a plurality of electrodes regularly arranged in rows and columns, the multiplexer 200 for electrically connecting some of the electrodes to form the plurality of sensing channels 110a to 110d, and the sensor driving unit 300 for providing driving signals to the sensing channels 110a to 110d. The multiplexer 200 may be connected to the electrodes 110, 120, 130, and 140 arranged in a specific column through the connection lines CL1, CL2, CL3, and CL4. The lengths of the connection lines CL1, CL2, CL3, and CL4 may be differently set according to positions of electrodes arranged in a specific row.

The multiplexer 200 may form a sensing channel by connecting a plurality of electrodes in a row or a column. The sensor driving unit 300 may be operably coupled to the multiplexer 200. The sensor driving unit 300 may perform a control operation so that a driving signal of a voltage waveform of a specific cycle is applied to electrodes.

The sensor driving unit 300 may apply pulse-shaped driving signals having different driving frequencies to each specific row. The sensor driving unit 300 may apply a 0th driving signal of a 0th driving frequency to a 0th row. The sensor driving unit 300 may apply a first driving signal of a first driving frequency to a first row. The sensor driving unit 300 may apply a second driving signal of a second driving frequency to a second row adjacent to the first row. The sensor driving unit 300 may apply an (N−1)th driving signal of an (N−1)th driving frequency to an (N−1)th row. The sensor driving unit 300 may apply an Nth driving signal of an Nth driving frequency to an N row adjacent to the (N−1)th row.

The sensor driving unit 300 may apply pulse-shaped driving signals having different driving frequencies for each specific row in the first frame (F1) including a plurality of pulses. The sensor driving unit 300 may determine a time point of a second frame adjacent to the first frame (F1) based on the timing at which falling edges of the driving signals of the first frame (F1) coincide with each other. The sensor driving unit 300 may apply pulse-shaped driving signals having different driving frequencies to each specific row in the second frame. The sensor driving unit 300 may determine a time point of a third frame (F3) adjacent to the second frame based on the timing at which falling edges of the driving signals of the second frame coincide with each other. The sensor driving unit 300 may apply pulse-shaped driving signals having different frequencies to each specific row in the third frame (F3). In this regard, a driving voltage applied to a specific row may be set to have different driving frequencies in the first frame (F1), the second frame (F2), and the third frame (F3).

The sensor driving unit 300 may apply the first driving signal of the first driving frequency to the first row in the first frame (F1) including a plurality of pulses. The sensor driving unit 300 may apply a driving signal of one of the second to Nth driving frequencies other than the first driving frequency in the second frame adjacent to the first frame (F1). The sensor driving unit 300 may apply a driving signal of a driving frequency other than the driving frequency in the first and second frames (F1 and F2) in the third frame (F3) adjacent to the second frame (F2).

The sensor driving unit 300 may control the driving frequency in different ways depending on whether the amount of EMI radiation of a specific connection line to which a driving signal is applied is less than or equal to a threshold. When the amount of EMI radiation of the specific connection line to which the driving signal is applied is less than or equal to the threshold, the sensor driving unit 300 may apply driving signals of the first to Nth driving frequencies to the first to Nth rows. When the amount of EMI radiation of the specific connection line exceeds the threshold, the sensor driving unit 300 may change all the driving frequencies of the driving signals applied to the first to Nth rows to different driving frequencies.

When the amount of EMI radiation of the specific connection line exceeds the threshold, the sensor driving unit 300 may adjust a specific driving frequency of a specific row corresponding to the specific connection line and adjacent driving frequencies of adjacent rows adjacent to the specific row. The sensor driving unit 300 may determine the specific driving frequency and frequency offsets so that frequency offsets of the specific driving frequency of the specific row and the adjacent driving frequencies of the adjacent rows adjacent to the specific row are greater than or equal to a threshold.

In this regard, when the amount of EMI radiation in the (N−1)th row exceeds the threshold, a driving frequency of the (N−1)th row may be set to a lowest frequency (longest period) as illustrated in FIG. 3. Meanwhile, the driving frequency of the Nth row adjacent to the (N−1)th row may be set to a highest frequency (shortest period) to determine specific driving frequencies and frequency offsets so that the frequency offsets are greater than or equal to the threshold. In addition, a frequency offset of a driving frequency of an (N−2)th row adjacent to the (N−1)th row may be set so that a frequency offset from the driving frequency of the (N−1)th row is greater than or equal to the threshold.

When the amount of EMI radiation of the specific connection line exceeds the threshold in the first frame (F1), the sensor driving unit 300 may change all the driving frequencies of the driving signals applied to the first to Nth rows to different driving frequencies in the second frame (F2). The sensor driving unit 300 may set a second frame period of the second frame (F2) to be shorter than a first frame period of the first frame (F1).

When the amount of EMI radiation of the specific connection line exceeds the threshold in the second frame (F2), the sensor driving unit 300 may change all the driving frequencies of the driving signals applied to the first to Nth rows to different driving frequencies in the third frame (F3). The sensor driving unit 300 may set a third frame period of the third frame (F3) to be shorter than the second frame period of the second frame (F2).

When the amount of EMI radiation of the specific connection line is less than or equal to the threshold in the second frame (F2), the sensor driving unit 300 may change all the driving frequencies of the driving signals applied to the first to Nth rows to different driving frequencies in the third frame (F3). The sensor driving unit 300 may set the third frame period of the third frame (F3) to be longer than the second frame period of the second frame (F2).

When the amount of EMI radiation of the specific connection line is less than or equal to a second threshold lower than the threshold in the third frame (F3), the sensor driving unit 300 may maintain the driving frequencies of the driving signals applied to the first to Nth rows.

When the amount of EMI radiation exceeds the second threshold and is less than or equal to the threshold, the sensor driving unit 300 may change all the driving frequencies of the driving signals applied to the first to Nth rows to different driving frequencies in a fourth frame (F4) adjacent to the third frame (F3). The sensor driving unit 300 may set a fourth frame period of the fourth frame (F4) to be shorter than the third frame period of the third frame (F3).

The sensor driving unit 300 may determine, in conjunction with an EMI detection unit 400, whether an EMI peak value at a specific frequency is less than or equal to the magnitude of a threshold or has decreased by a predetermined value or more based on a maximum value. When the EMI peak value is decreased as in FIG. 9 as a result of determination, the sensor driving unit 300 may set the driving frequencies to repeat a frequency hopping result in which the driving frequencies in the first frame (F1), the second frame (F2), and the third frame (F3) are changed. The sensor driving unit 300 may repeat sequences of the driving frequencies so that the order of the first frame (F1), the second frame (F2), and the third frame (F3) is repeated.

Figure 9:
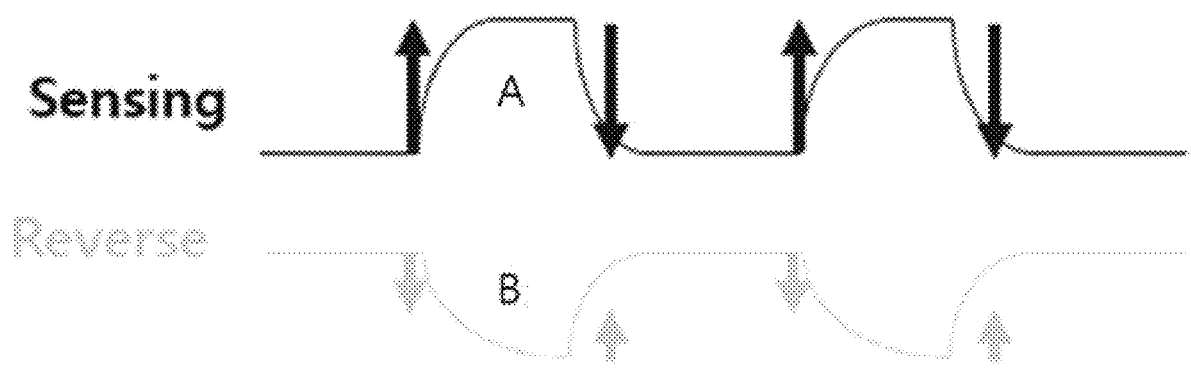
FIG. 9 is a conceptual diagram illustrating that an EMI component of a sensing signal is canceled out.
Figure 10:
FIG. 10 illustrates square wave signals having different slew rates.

Meanwhile, the sensor driving unit 300 may control driving signals between adjacent rows in different ways depending on the amount of EMI radiation of a specific connection line to which a driving signal is applied. In this regard, FIG. 9 is a conceptual diagram illustrating that an EMI component of a sensing signal is canceled out. Meanwhile, FIG. 10 illustrates square wave signals having different slew rates.

Referring to FIG. 9, a driving signal using a reverse method in the form of a reverse voltage of a square wave, which is a sensing waveform, may be used to reduce EMI of the touchscreen. The reverse method is a method of generating an electromagnetic field opposite to the sensing waveform to cancel out EMI.

A driving signal of a voltage waveform of a specific cycle may be formed as a first area (A) between a rising edge and a falling edge. In relation to the reverse method, a second area (B) of a reverse region in a reverse voltage form may be varied to more effectively cancel out a sensing signal.

EMI is mainly generated at the timing of the rising/falling edge of the sensing waveform, and as intensity thereof increases, EMI increases. The reverse method is a method of canceling out EMI by causing the rising edge of the sensing waveform to fall and causing the falling edge of the sensing waveform to rise with the same intensity, and may cancel out EMI using electromagnetic fields opposite to each other.

The reverse method may have different results depending on the design method and implementation. In particular, as the size of the TSP increases, sensing columns have deviations in the same physical properties, which causes deviations in the amount of EMI radiation for each sensing driving column. To compensate therefor, the second area (B) of the reverse voltage waveform corresponding to the sensing driving column may be increased or decreased to cancel out an EMI component of the sensing waveform as much as possible.

Referring to FIG. 10, EMI is closely related to the slew rate of the voltage waveform. As resistance and capacitance values increase, a waveform having a lower slew rate in the form of (a) in FIG. 10 is output. On the other hand, as the capacitance value decreases, a waveform having a higher slew rate in the form of (b) in FIG. 10 is output. When the amount of EMI radiation is compared, the waveform in the form of (b) in FIG. 10, which is the waveform having the higher slew rate, exhibits a greater amount of EMI radiation.

The touch detection device 10 according to the present invention will be described with reference to FIG. 1 and FIGS. 9 and 10. The touch detection device 10 may be configured so that sensing is sequentially performed from a first row (Row_0) to a tenth row (Row_9). EMI mainly occurs in a section where the sensing voltage rises/falls. Meanwhile, since a wiring length, a sensor area, etc. are different for each sensor, resistance and capacitance values are differently formed, and thus the amount of EMI radiation is differently formed. This may be a main reason for each sensor not having the same slew rate of the sensing waveform and each sensor exhibiting a deviation in the amount of EMI.

Meanwhile, the sensor driving unit 300 may control the time points of the falling edge and the rising edge, as well as change the second area (B) of the reverse voltage waveform to cancel out an EMI component of the voltage waveform. In this regard, the sensor driving unit 300 may detect the rising edge and the falling edge of the driving signal of the voltage waveform for each specific column or each specific row. The sensor driving unit 300 may detect the first area (A) between the rising edge and the falling edge. The sensor driving unit 300 may cancel out the EMI component of the voltage waveform by changing the second area (B) of the second driving signal of the reverse voltage waveform to correspond to the first area (A).

In this regard, the sensor driving unit 300 may determine, in conjunction with the EMI detection unit 400, whether an EMI peak value at a specific frequency is less than or equal to the magnitude of a threshold or has decreased by a predetermined value or more based on a maximum value. Upon determining that the EMI peak value has not decreased as a result of determination, the sensor driving unit 300 may detect the first area (A) between a rising edge and a falling edge. The sensor driving unit 300 may change the second area (B) of the second driving signal of the reverse voltage waveform to correspond to the first area (A) to cancel out the EMI component of the voltage waveform.

The touch detection device capable of suppressing the EMI effect according to the present invention has been described above. Technical effects of the touch detection device capable of suppressing the EMI effect may be summarized as follows. However, the present invention is not limited thereto.

The present invention provides an advantage in that the EMI effect may be effectively suppressed in the touch detection device.

According to the present invention, the amount of EMI radiation exhibited at a specific frequency may be alleviated through frequency hopping of a driving voltage in a row direction.

According to the present invention, it is possible to provide a method of driving a touch panel capable of reducing EMI with an adjacent electronic device by applying a driving voltage in a reverse voltage form to an adjacent column through frequency hopping for each frame of a driving voltage in the row direction.

The effects of the present invention are not limited to those mentioned above, and other tasks not mentioned herein may be clearly understood by those skilled in the art from the above description.

According to the present invention, it is possible to alleviate the amount of EMI radiation exhibited at a specific frequency by frequency hopping of a driving voltage in the row direction and application of a driving voltage in a reverse voltage form to an adjacent column.

According to the present invention, it is possible to provide a method of driving a touch panel capable of reducing EMI with an adjacent electronic device by applying a driving voltage in a reverse voltage form to an adjacent column through frequency hopping for each frame of a driving voltage in the row direction.

According to the present invention, the sensor driving unit may apply the second driving signal of the reverse voltage waveform to the electrode of the one of two rows adjacent to the specific row when a length of the specific connection line is greater than or equal to a critical length, and apply the second driving signal and the third driving signal of the reverse voltage waveform to the electrodes of the two rows adjacent to the specific row, respectively, when the length of the specific connection line is less than the critical length.

The effects of the present invention are not limited to those mentioned above, and other tasks not mentioned herein may be clearly understood by those skilled in the art from the above description.

Even though the present invention has been described with respect to specific embodiments of the present invention, these are merely examples and the present invention is not limited thereto. Those skilled in the art to which the present invention pertains may change or modify the described embodiments without departing from the scope of the present invention, and various modifications and variations are possible within the scope of the technical idea of the present invention and the equivalent scope of the patent claims to be described below.

The invention claimed is:

1. A touch detection device comprising:
   a panel including a plurality of electrodes regularly arranged in rows and columns;
   a multiplexer connected to electrodes arranged in one of the columns through connection lines and configured to form a sensing channel by connecting the electrodes arranged in the one of the columns; and
   a sensor driving unit operably coupled to the multiplexer and configured to perform a control operation such that a driving signal of a voltage waveform of a specific cycle is applied to the electrodes arranged in the one of the columns, wherein:
   lengths of the connection lines are differently set according to positions of electrodes arranged in each of the rows, and
   wherein the sensor driving unit is configured to:
   apply first pulse-shaped driving signals having first different driving frequencies to one of the rows in a first frame including a plurality of pulses,
   determine a start point of a second frame adjacent to the first frame based on timing at which falling edges of the first pulse-shaped driving signals in the first frame coincide with each other,
   apply second pulse-shaped driving signals having second different driving frequencies to the one of the rows in the second frame,
   determine a start point of a third frame adjacent to the second frame based on timing at which falling edges of the second pulse shaped driving signals in the second frame coincide with each other,
   apply third pulse-shaped driving signals having third different driving frequencies to the one of the rows in the third frame, and
   set the driving frequencies applied to the one of the rows such that the first, second, and third different driving frequencies are different from each other,
   wherein, when an amount of electromagnetic interference (EMI) radiation of a specific connection line exceeds a radiation threshold, the sensor driving unit determines a specific driving frequency of a row corresponding to the specific connection line and frequency offsets of the specific driving frequency and driving frequencies applied to rows adjacent to the row corresponding to the specific connection line, such that the frequency offsets are greater than or equal to an offset threshold,
   wherein the rows of the plurality of electrodes include first to Nth rows, and
   wherein the sensor driving unit is configured to:
   change all the driving frequencies of the driving signals applied to the first to Nth rows in the second frame to fourth different driving frequencies and set a second frame period of the second frame to be shorter than a first frame period of the first frame when an amount of EMI radiation of the specific connection line in the first frame exceeds the radiation threshold, and change all the driving frequencies of the driving signals applied to the first to Nth rows in the third frame to fifth different driving frequencies and set a third frame period of the third frame to be shorter than the second frame period of the second frame when an amount of EMI radiation of the specific connection line in the second frame exceeds the radiation threshold.

2. The touch detection device according to claim 1, wherein the sensor driving unit is configured to:
apply a first driving signal of a first driving frequency to the first row,
apply a second driving signal of a second driving frequency to the second row adjacent to the first row,
apply an (N−1)th driving signal of an (N−1)th driving frequency to the (N−1)th row, and
apply an Nth driving signal of an Nth driving frequency to the Nth row adjacent to the (N−1)th row.

3. The touch detection device according to claim 2, wherein the sensor driving unit is configured to:
apply the first driving signal of the first driving frequency to the first row in the first frame including the plurality of pulses,
apply a driving signal of one of the second to Nth driving frequencies other than the first driving frequency in the second frame, and
apply a driving signal of a driving frequency other than the driving frequencies in the first and second frames in the third frame.

4. The touch detection device according to claim 1, wherein the sensor driving unit is configured to:
apply the driving signals of the first to Nth driving frequencies to the first to Nth rows when the amount of EMI radiation of the specific connection line to which one of the driving signals is applied is less than or equal to the radiation threshold, and
change all the driving frequencies of the driving signals applied to the first to Nth rows to sixth different driving frequencies when the amount of EMI radiation of the specific connection line exceeds the radiation threshold.

5. The touch detection device according to claim 1, wherein the sensor driving unit is configured to:
change all the driving frequencies of the driving signals applied to the first to Nth rows in the third frame to sixth different driving frequencies and set the third frame period of the third frame to be longer than the second frame period of the second frame when the amount of EMI radiation of the specific connection line in the second frame is less than or equal to the radiation threshold, and
maintain the driving frequencies of the driving signals applied to the first to Nth rows when an amount of EMI radiation of the specific connection line in the third frame is less than or equal to a second radiation threshold lower than the radiation threshold.

6. The touch detection device according to claim 1, wherein, when an amount of EMI radiation of the specific connection line in the third frame exceeds a second radiation threshold and is less than or equal to the radiation threshold, the sensor driving unit changes all the driving frequencies of the driving signals applied to the first to Nth rows in a fourth frame adjacent to the third frame to sixth different driving frequencies and sets a fourth frame period of the fourth frame to be shorter than the third frame period of the third frame.

7. The touch detection device according to claim 1, wherein the sensor driving unit is configured to:
determine whether an EMI peak value at a specific frequency is less than or equal to a magnitude of an EMI peak threshold or has decreased by a predetermined value or more based on a maximum value in conjunction with an EMI detection unit,
set the driving frequencies to repeat a frequency hopping result in which the driving frequencies in the first frame, the second frame, and the third frame are changed when the EMI peak value has decreased as a result of determination, and
repeat sequences of the driving frequencies such that an order of the first frame, the second frame, and the third frame is repeated.

8. The touch detection device according to claim 1, wherein the sensor driving unit is configured to:
determine whether an EMI peak value at a specific frequency is less than or equal to a magnitude of an EMP peak threshold or has decreased by a predetermined value or more based on a maximum value in conjunction with an EMI detection unit,
detect a rising edge and a falling edge of the driving signal of the voltage waveform for each specific column or each specific row upon determining that the EMI peak value has not decreased as a result of determination,
detect a first area between the rising edge and the falling edge, and
cancel out an EMI component of the voltage waveform by changing a second area of a first driving signal of a reverse voltage waveform to correspond to the first area.

* * * * *